(12) United States Patent
Mills (10) Patent No.: US 10,488,293 B1
(45) Date of Patent: Nov. 26, 2019

(54) CONDUCTIVE GEOTEXTILE

(71) Applicant: Layfield Group Ltd., Edmonton (CA)

(72) Inventor: James Andrew Mills, Edmonton (CA)

(73) Assignee: Layfield Group Ltd., Edmonton (CA)

( * ) Notice: Subject to any disclaimer, the term of this patent is extended or adjusted under 35 U.S.C. 154(b) by 3 days.

(21) Appl. No.: 16/156,807

(22) Filed: Oct. 10, 2018

(51) Int. Cl.
  *G01M 3/16* (2006.01)

(52) U.S. Cl.
  CPC ..................... *G01M 3/16* (2013.01)

(58) Field of Classification Search
  CPC ...... G01M 3/40; B01D 65/102; B01D 65/104
  See application file for complete search history.

(56) References Cited

U.S. PATENT DOCUMENTS

| | | | | |
|---|---|---|---|---|
| 4,404,516 A | * | 9/1983 | Johnson, Jr. | G01M 3/045 73/40.5 R |
| 4,540,624 A | * | 9/1985 | Cannady, Jr. | B29C 70/08 442/246 |
| 4,876,140 A | * | 10/1989 | Quackenbush | B29C 47/065 428/216 |
| 4,947,470 A | * | 8/1990 | Darilek | G01M 3/40 324/326 |
| 5,288,168 A | | 2/1994 | Spencer | |
| 5,362,182 A | * | 11/1994 | Hergenrother | B09B 1/00 405/129.5 |
| 5,544,976 A | * | 8/1996 | Marchbanks | B32B 27/12 405/129.6 |
| 5,747,134 A | | 5/1998 | Mohammed et al. | |
| 5,850,144 A | * | 12/1998 | Howells | E02D 31/004 324/559 |
| 5,877,096 A | * | 3/1999 | Stevenson | E02B 11/00 428/86 |
| 5,882,453 A | * | 3/1999 | Stark | B09B 1/00 156/70 |
| 5,980,155 A | * | 11/1999 | Jones | B32B 5/26 405/43 |

(Continued)

FOREIGN PATENT DOCUMENTS

| | | |
|---|---|---|
| EP | 0 962 754 B1 | 11/2002 |
| EP | 1 096 077 A1 | 5/2011 |

(Continued)

OTHER PUBLICATIONS

Brachman, R.W.I., et al., "Adhesion from Supplemental Bentonite Placed at GCL overlaps" 63rd Canadian Geotechnical Conference, Calgary,Can., Sep. 2012, pp. 1359-1364.

*Primary Examiner* — Lisa M Caputo
*Assistant Examiner* — Tran M. Tran
(74) *Attorney, Agent, or Firm* — Christensen O'Connor Johnson Kindness, PLLC (57) ABSTRACT

A conductive geotextile for use in a leak detection system is disclosed. The conductive geotextile has a flexible substrate with a first face and a second face and a polymer layer laminated to the substrate. The polymer layer may be equal to or less than 0.006 inches thick and has a first face and a second face, with the second face adjacent to the first face of the substrate. The polymer layer has a conductive thin film coextruded onto a core, with the conductive film being at the first face of the polymer layer. The conductive thin film may be equal to or less than 0.003 inches thick and has a surface resistivity equal to or less than 4000 ohm per square.

19 Claims, 7 Drawing Sheets

(56) References Cited

U.S. PATENT DOCUMENTS

| | | | | |
|---|---|---|---|---|
| 6,056,477 | A * | 5/2000 | Ueda | B09B 1/00 340/605 |
| 6,222,373 | B1 * | 4/2001 | Morrison | G01M 3/16 324/532 |
| 6,505,996 | B1 * | 1/2003 | Ianniello | E01F 5/00 404/2 |
| 6,648,552 | B1 * | 11/2003 | Smith | B09B 1/00 405/129.5 |
| 6,953,619 | B2 * | 10/2005 | Dean | C08L 101/12 29/600 |
| 7,115,311 | B2 * | 10/2006 | Arthurs | B65D 65/02 428/36.2 |
| 7,975,556 | B2 * | 7/2011 | Hatami | G01L 1/20 73/788 |
| 8,361,261 | B2 * | 1/2013 | Van Fossen | B29C 65/5028 156/182 |
| 8,440,289 | B2 * | 5/2013 | De Giuseppe | B32B 3/30 428/167 |
| 8,604,799 | B2 * | 12/2013 | Rodel | E02D 31/02 324/527 |
| 8,864,423 | B2 * | 10/2014 | Oliveira | E02D 17/202 405/270 |
| 8,932,709 | B2 * | 1/2015 | Carter | E02D 31/004 405/302.7 |
| 8,970,201 | B2 | 3/2015 | Durkheim | |
| 9,244,030 | B2 * | 1/2016 | Vokey | G01N 27/20 |
| 9,341,540 | B2 * | 5/2016 | Gunness | G01M 3/40 |
| 9,500,555 | B2 * | 11/2016 | Gunness | G01M 3/16 |
| 9,517,596 | B2 * | 12/2016 | Powell | B32B 5/022 |
| 9,517,597 | B2 * | 12/2016 | Powell | B32B 5/022 |
| 9,624,671 | B1 * | 4/2017 | Gunness | E04D 13/006 |
| 9,771,703 | B1 * | 9/2017 | Golding, Jr. | B32B 5/022 |
| 9,975,293 | B2 * | 5/2018 | Youngblood, Jr. | G01M 3/40 |
| 2002/0028110 | A1 * | 3/2002 | Rhee | G01M 3/04 405/129.5 |
| 2006/0105163 | A1 * | 5/2006 | Bray | B32B 27/06 428/339 |
| 2016/0153163 | A1 * | 6/2016 | Weinstein | E02D 31/002 405/52 |
| 2017/0320303 | A1 * | 11/2017 | Taghizadeh | B32B 27/18 |
| 2018/0242530 | A1 * | 8/2018 | Van Giel | A01G 7/045 |
| 2018/0320380 | A1 * | 11/2018 | Crowther | E02D 31/008 |
| 2019/0040548 | A1 * | 2/2019 | Aitchison | D06M 11/74 |
| 2019/0212222 | A1 * | 7/2019 | Aitchison | B32B 5/02 |

FOREIGN PATENT DOCUMENTS

| | | |
|---|---|---|
| WO | 94/02822 A1 | 2/1994 |
| WO | 2016/001639 A1 | 1/2016 |
| WO | 2016/001640 A1 | 1/2016 |
| WO | 2017/132734 A1 | 8/2017 |

* cited by examiner

CONDUCTIVE GEOTEXTILE

TECHNICAL FIELD

This relates to a conductive geotextile, and in particular, a geotextile made with a conductive plastic

BACKGROUND

Geomembranes are commonly used as a waterproof barrier in a variety of situations, such as in roofing applications, liners for landfills or for water storage, etc. To test the integrity of the geomembrane, an electrical leak detection system may be used. U.S. Pat. No. 8,970,201 (Durkehim) entitled "Geocomposite enabling leak detection by electrical scan, and method for use" discloses an example of a leak detection system that involves a grounded conductive geotextile below a geomembrane.

SUMMARY

According to an aspect, there is provided a conductive geotextile for use in a leak detection system. The conductive geotextile comprises a flexible substrate that has a first face and a second face, and a polymer layer that is equal to or less than 0.006 inches thick and has a first face and a second face. The polymer layer is laminated to the substrate such that the first face of the substrate is adjacent to the second face of the polymer layer. The polymer layer comprises a comprises a conductive thin film coextruded onto a core, such that the first face of the polymer layer comprises the conductive thin film, the conductive thin film being equal to or less than 0.003 inches thick and has a surface resistivity of equal to or less than 4000 ohms per square.

According to other aspects, the conductive geotextile may comprise any of the following features, alone or in combination: the second face of the polymer may comprise one or more additional polymer thin films coextruded onto the core; the substrate and polymer layers may be laminated by needlepunching, heatbonding, or adhesive; the conductive geotextile may be permeable to fluids; the substrate may be selected from a group consisting of: a woven geotextile, a non-woven geotextile, a knitted fabric, a laid fabric, and a woven tape; the conductive polymer may comprise a connector portion that extends past a side edge of the substrate; and the conductive polymer layer may comprise a connector portion that wraps around a side edge of the substrate from the first face of the substrate to the second face of the substrate.

According to an aspect, there is provided, in combination: a membrane that is electrically insulating and impermeable, a leak detection system that detects a leak across the membrane. The leak detection system comprises a conductive geotextile sheet that is separate and distinct from the membrane, the conductive geotextile sheet comprises: a flexible substrate having a first face and a second face, a polymer layer having a first face and a second face, the polymer layer being laminated to the substrate such that the first face of the substrate is adjacent to the second face of the polymer layer, wherein the polymer layer comprises a conductive thin film coextruded onto a core, such that the first face of the polymer layer comprises the conductive thin film; a detector; and a voltage source that applies an electrical potential between the detector and conductive geotextile across the membrane, such that the detector detects a leak when an electrical connection with the conductive geotextile is formed.

According to other aspects, the combination may comprise any of the following features, alone or in combination: the second face of the polymer layer may comprise one or more additional polymer layers coextruded onto the core; the polymer layer may have a thickness of less than or equal to 0.006 inches; the conductive polymer layer may have a thickness of less than or equal to 0.003 inches; the conductive polymer may have a surface resistivity that is less than or equal to 4000 ohms per square; the substrate and polymer layers may be laminated by needlepunching, heat bonding or adhesive; the conductive geotextile may be permeable to fluids; the conductive geotextile may be placed between the membrane and a non-conductive surface; the substrate may be selected from a group consisting of: a woven geotextile, a non-woven geotextile, a knitted fabric, a laid fabric, and a woven tape; the conductive polymer may comprise a connector portion that extends past a side edge of the substrate; the conductive polymer layer may comprise a connector portion that wraps around a side edge of the substrate from the first face of the substrate to the second face of the substrate; the conductive geotextile may be placed between two electrically insulating and impermeable membranes; and the conductive geotextile may be laminated to a geonet.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

A conductive geotextile, generally identified by reference numeral 10, will now be described with reference to FIG. 1 through 9.

Figures 1, 2:
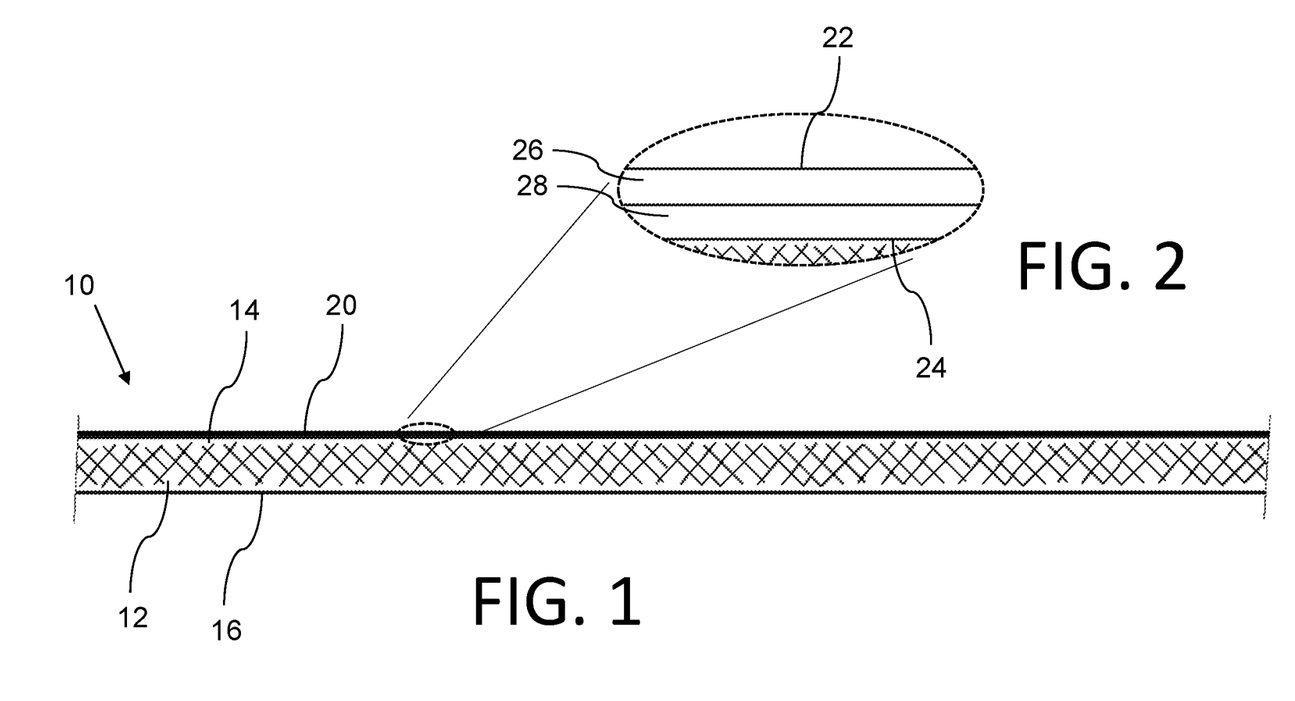
FIG. 1 is a side elevation view of a conductive geotextile.
FIG. 2 is a side elevation view of a conductive geotextile, showing a conductive polymer layer made from two co-extruded polymers.

Conductive geotextile 10 is a multi-layered flexible sheet of material. As shown in FIGS. 1 and 2, conductive geotextile 10 has a substrate layer 12 and a polymer layer 20. Substrate layer 12 has a first substrate face 14 and a second substrate face 16 and a polymer layer 20 has a first polymer face 22 and a second polymer face 24. Substrate layer 12 carries polymer layer 20, typically by laminating the layers together, such that first substrate face 14 is adjacent to second polymer face 24. Polymer layer 20 and substrate layer may be laminated together using various methods known in the art that achieve suitable properties of conductive geotextile 10. By way of example, polymer layer 20 may be laminated to substrate layer 12 by needle-punching, heat bonding, using adhesives, etc.

Figure 9:
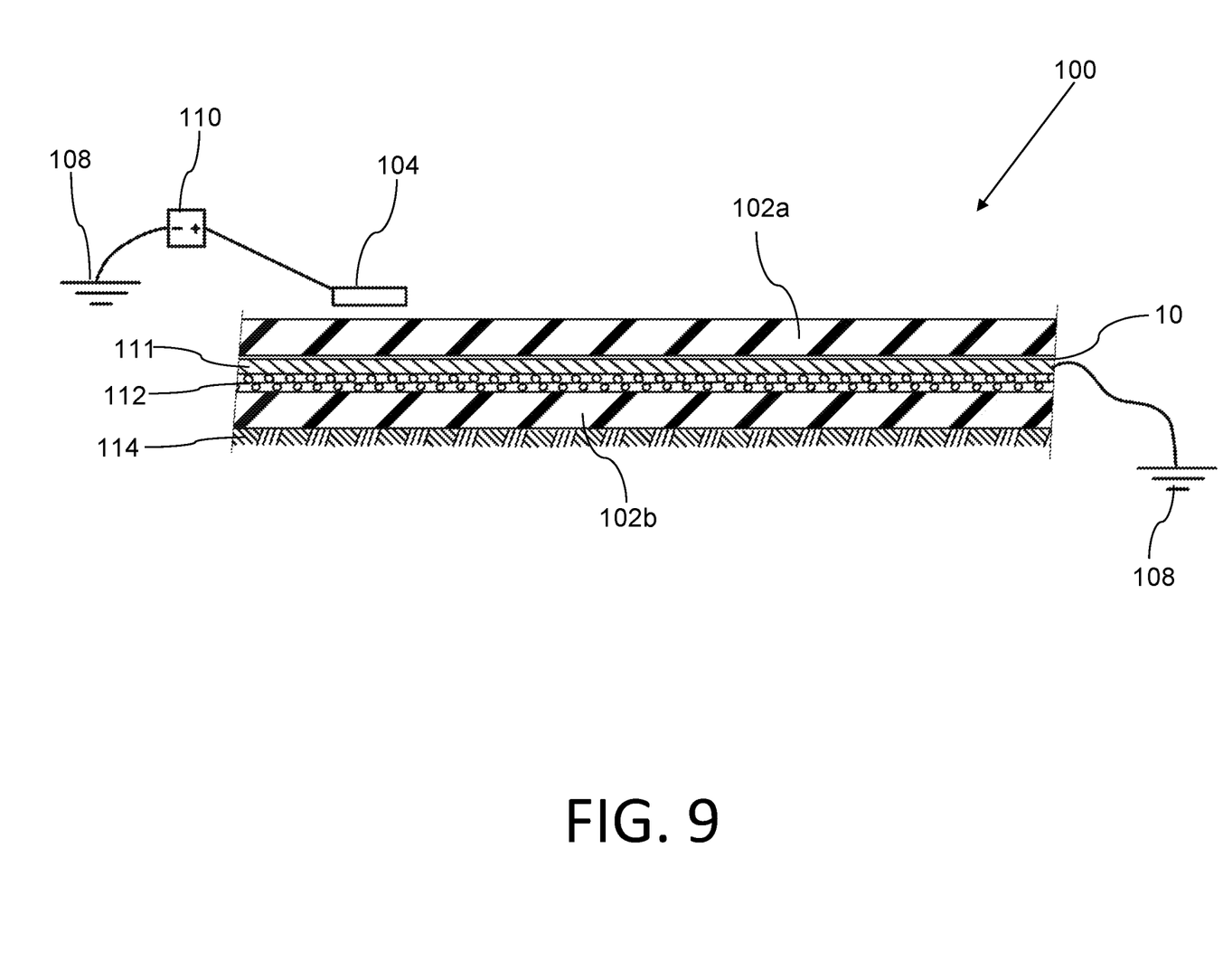
FIG. 9 is a side elevation view of a leak detection system for detecting a fluid leak across the top membrane of a dual membrane liner.

Substrate layer 12 may be any suitable geotextile or other material that is able to carry polymer layer 20. Typically, substrate layer 12 will be permeable to water, and acts as a structural support for polymer layer 20. Substrate layer 12 may be made from synthetic materials, such as polyester or polypropylene, and may be a woven geotextile, non-woven geotextile, knitted geotextile, laid fabric, woven tape, or combinations of more than one type of material. An example of a composite structure is shown in FIG. 9, where conductive geotextile 10 includes a geotextile layer 111 and a geonet layer 112.

In circumstances where it is beneficial to have conductive geotextile 10 permeable, it may be beneficial to attach polymer layer 20 using a needle-punching process, which both attaches substrate 12 and polymer layer 20, and forms apertures or holes in polymer layer 20, causing it to be permeable to fluid. In such a circumstance, it may be beneficial to also form substrate layer 12 using a needle-punching process as well. Alternatively the polymer layer 20 may be perforated before it is attached to a permeable substrate 12.

Figures 3, 4:
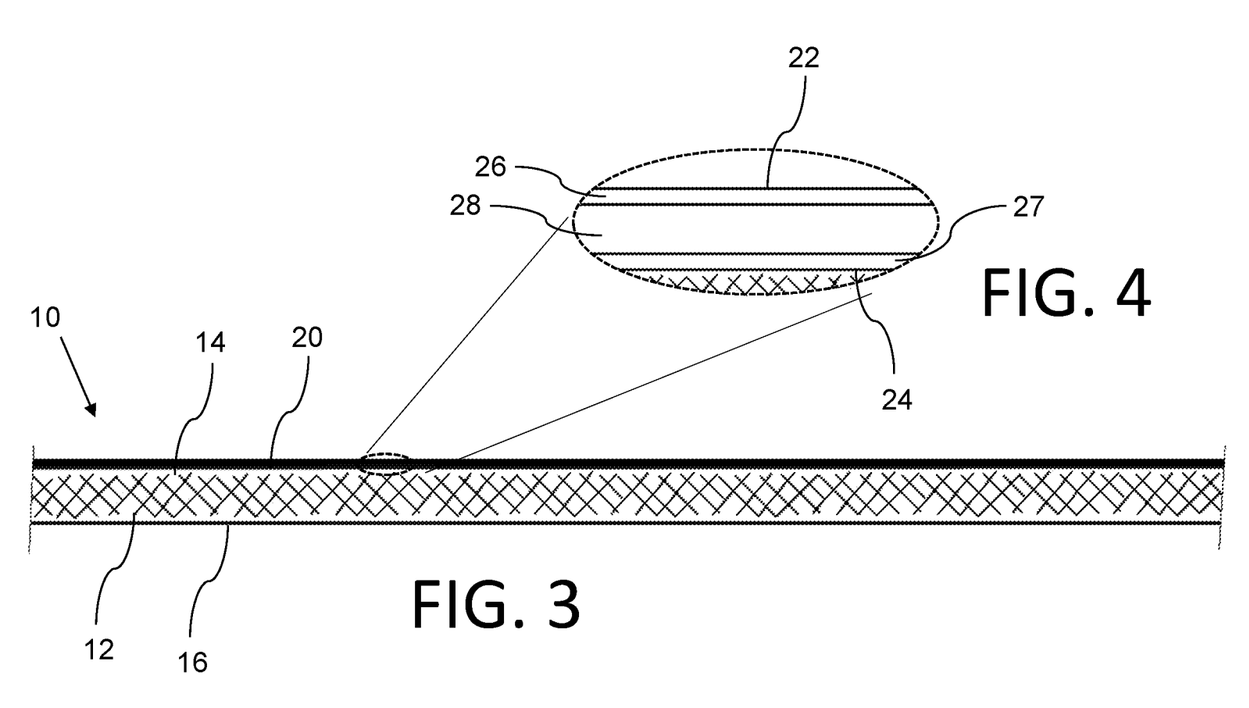
FIG. 3 is aside elevation view of a conductive geotextile.
FIG. 4 is a side elevation view of a conductive geotextile, showing a conductive polymer layer made from three co-extruded polymers.

Polymer layer 20 is a co-extruded layered structure. Referring to FIGS. 1 and 2, the structure of polymer layer 20 is shown as having a conductive thin film 26 and a core 28, where conductive thin film 26 is on the outside of the structure, i.e. located at first polymer face 22, so that it is electrically exposed. A two-layer structure is the simplest structure, and it will be understood that polymer layer 20 may have any number of additional polymer thin films that may be made using known manufacturing techniques, and that may be located at second polymer face 24 or between core 28 and conductive thin film 26. FIGS. 3 and 4 show an example of conductive geotextile 10 having polymer layer 20 with conductive thin film 26, core 28 and an additional thin film 27. Using co-extrusion process, polymer layer may be provided with various benefits or attributes by controlling the type of polymer and additives present in each layer. Common types of polymers used in co-extruding flexible sheets include as polyethylene, polypropylene, and other polyolefins. Other polymers known to those skilled in the art may also be used, depending on the preferences of the user and the desired physical properties. In one example, conductive thin film 26 may be made by combining polyethylene with an additive that imbues thin film 26 with conductive properties. Conductive additives may include carbon black, metal fibres, metal coated fillers, graphene, etc. Additional polymer thin films 27 may also be conductive, or may be selected to have other desirable properties, depending on the material and/or additive used.

In one example, polymer layer 20 may have has a thickness that is equal to or less than 0.006 inches, conductive thin film 26 may have a thickness equal to or less than 0.003 inches. and conductive thin film 26 may have a surface resistivity of less than 4000 ohms per square. As used herein, surface resistivity, which is measured in units of "ohms per square" is used to refer to the resistance of a thin conductive film with uniform thickness and undetermined width and length. A square of a thin film with uniform thickness will have the same resistance regardless of the lengths of the sides of the square. Surface resistivity may be tested using ASTM D4496 Standard Test Method for D-C Resistance or Conductance of Moderately Conductive Materials.

Figure 5:
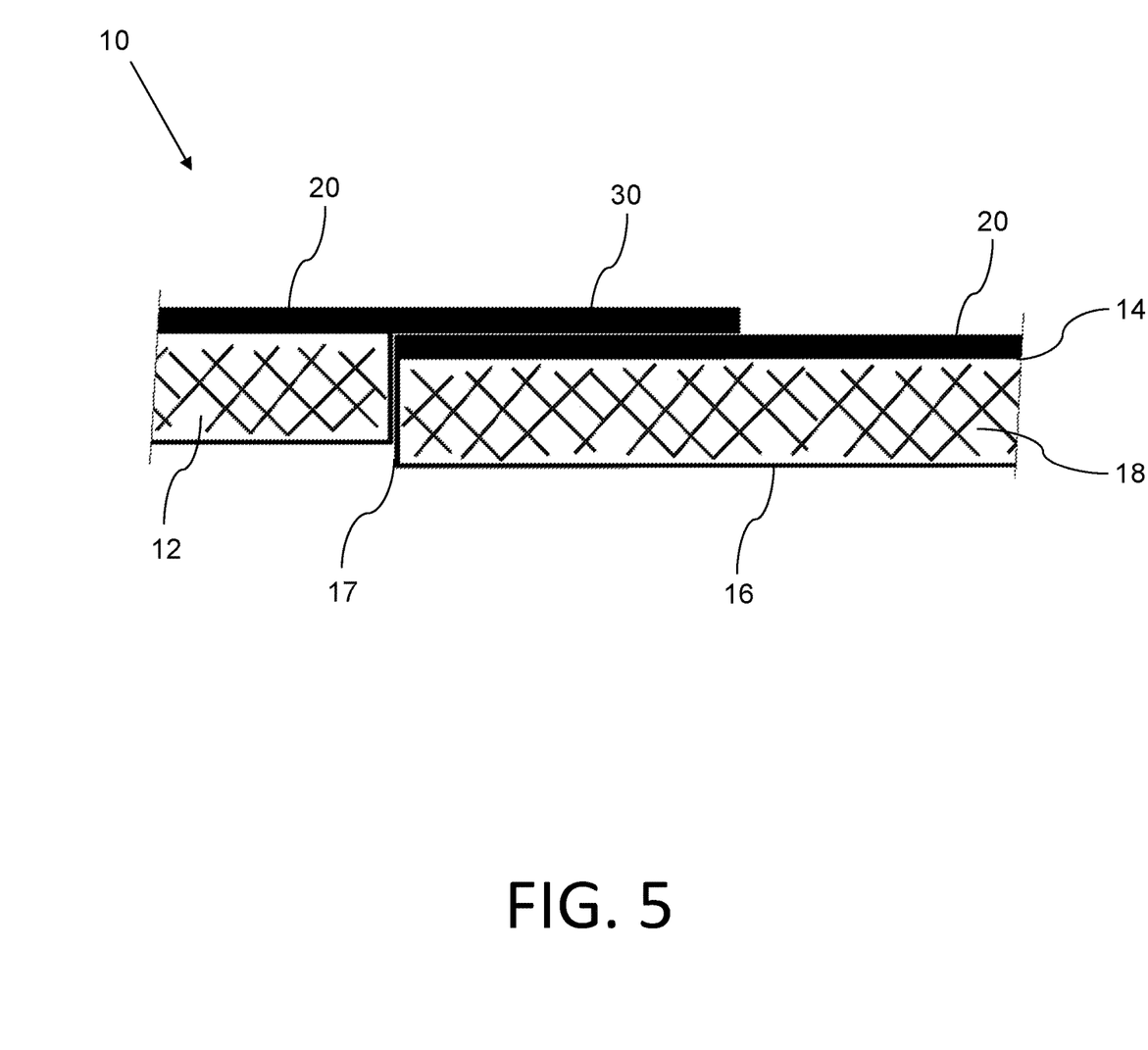
FIG. 5 is a side elevation view of overlapping conductive geotextile sections.
Figure 6:
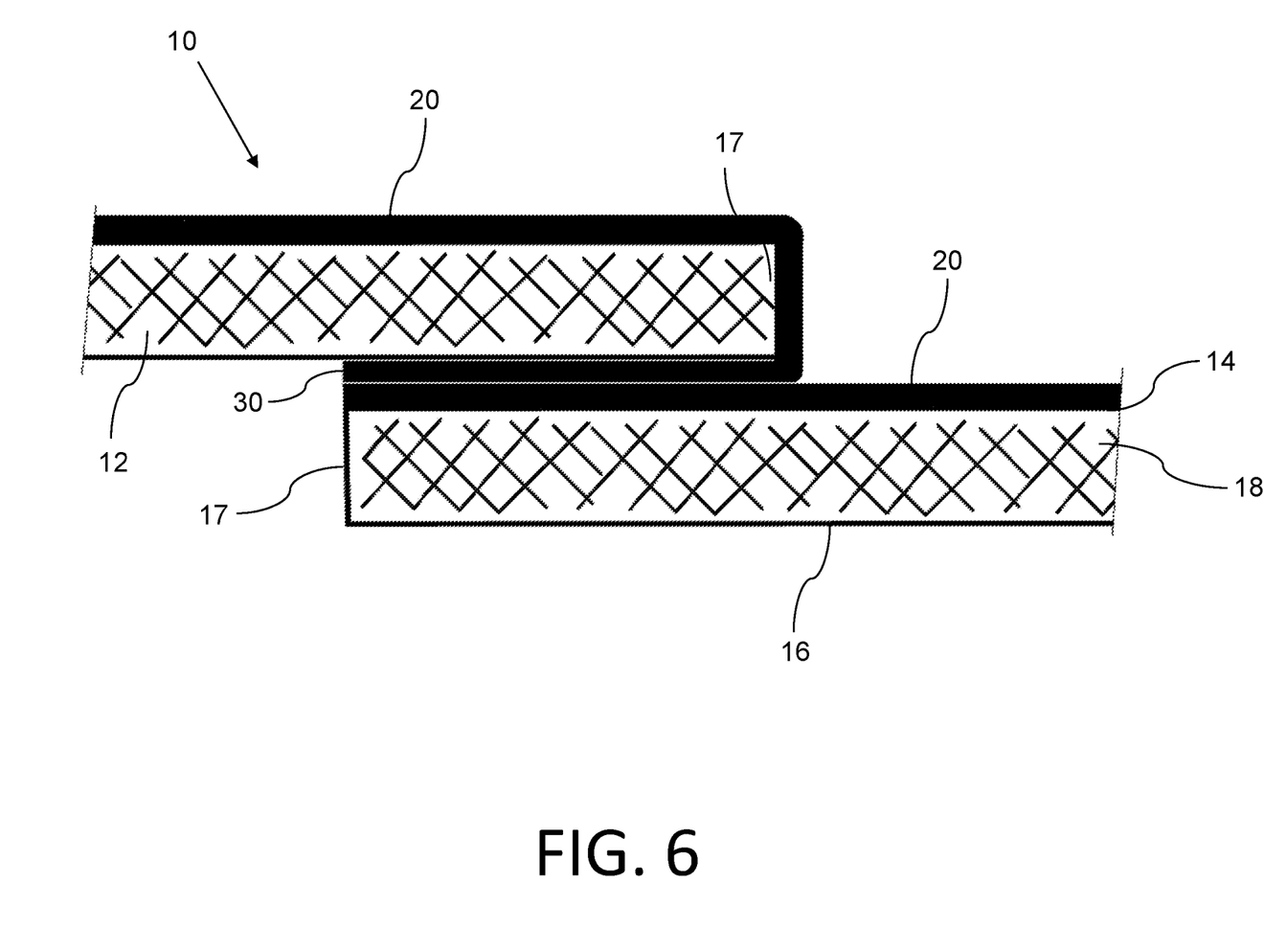
FIG. 6 is a side elevation view of overlapping conductive geotextile sections, with a polymer layer wrapped around on of the sections.

Conductive geotextile 10 may be fabricated as geotextile sections 18 that need to be connected together to make a larger, electrically connected sheet. In order to provide a robust electrical connection between adjacent sections 18, geotextile 10 may be laminated such that a connector portion 30 of polymer layer 20 extends past a side edge 17 of substrate 12. Connector portion 30 will typically be the entire polymer layer 20, but it may be possible to have connector portion 30 be made up of only a portion, such as conductive thin film 26. While different methods of establishing an electrical connection between adjacent sections 18 may be used, two examples are shown in FIGS. 5 and 6 using connector portions 30. Connector 30 may extend away from side edge 17 and overlap the adjacent section 18, as depicted in FIG. 5. Another example, depicted in FIG. 6, has a connector portion wrapped around side edge 17 and fastened to second substrate face 16, where the electrical connection is established by overlapping connector portion 30 with an adjacent section 18. Connector portion 30 may be laminated to second substrate face 16 using any of the methods provided above. If conductive geotextile 10 is formed using a needlepunching process, connector portion 30 may be folded around prior to needle punching.

Figure 7:
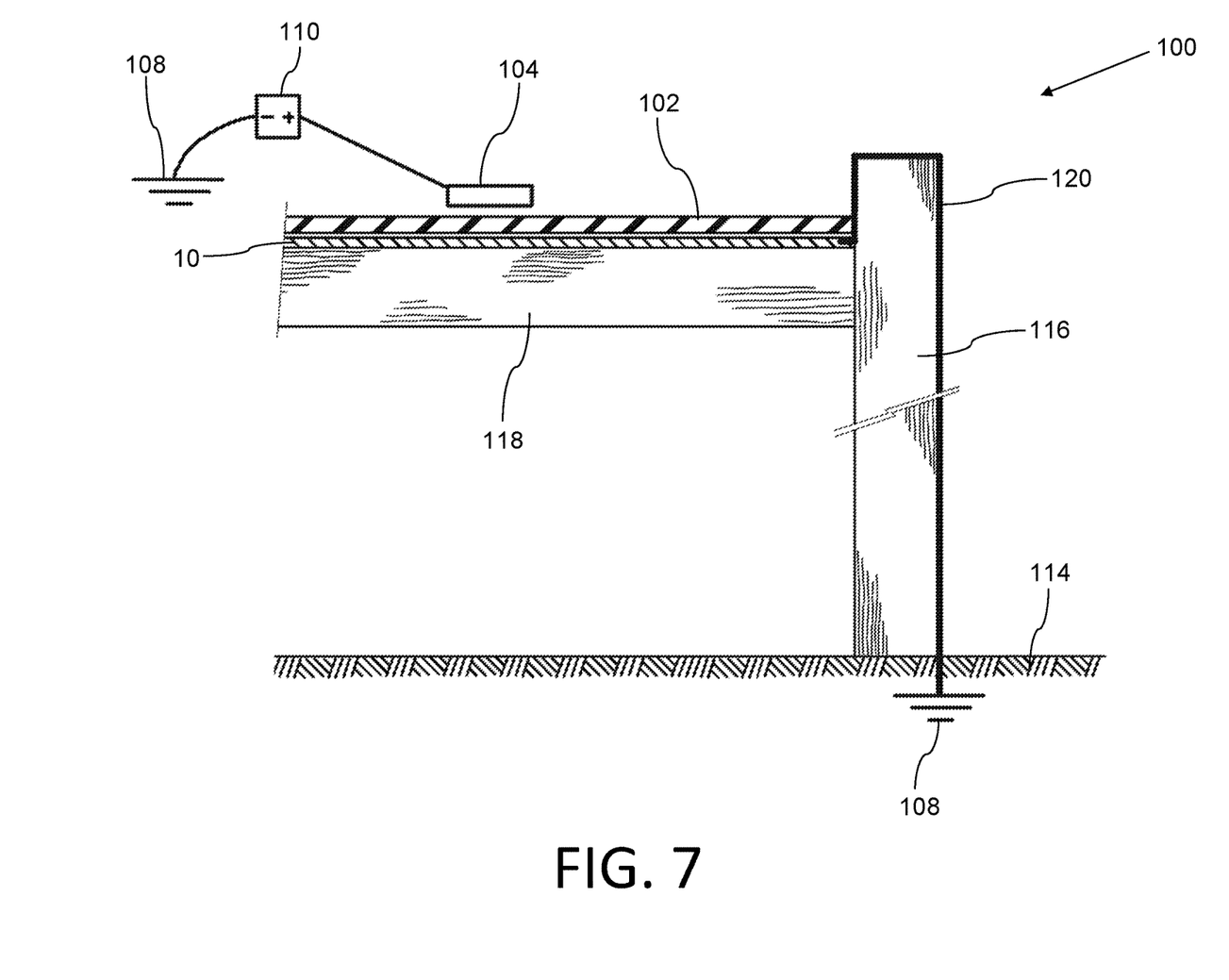
FIG. 7 is a side elevation view of a leak detecting system for detecting a fluid leak across a membrane place on the roof of a non-conductive building.
Figure 8:
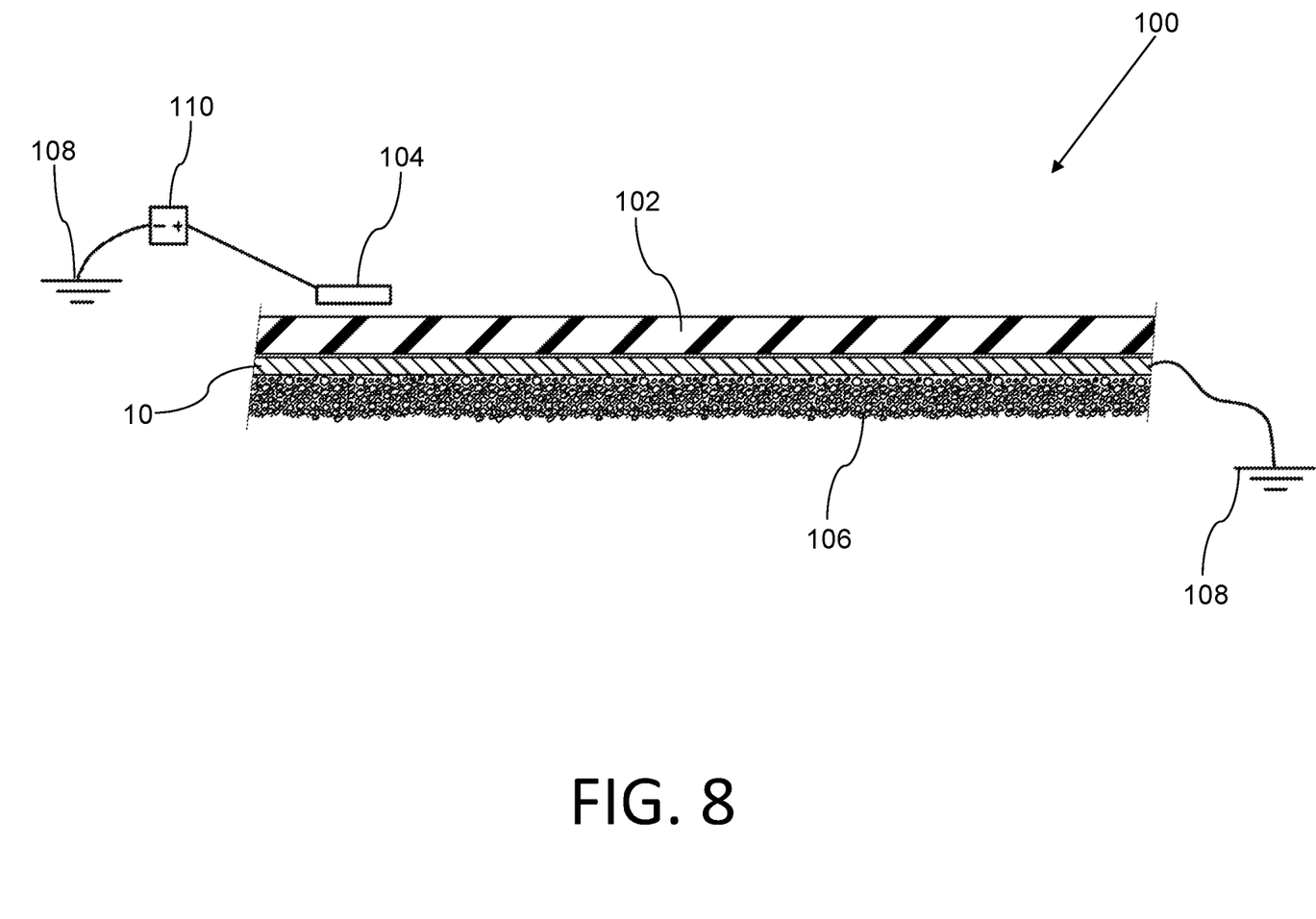
FIG. 8 is a side elevation view of a leak detection system for detecting a fluid leak across a membrane placed on a non-conductive surface.

Referring now to FIG. 7-9, conductive geotextile 10 may be used as a component of leak detection system 100. In this situation, conductive geotextile 10 is used to detects fluid leaks across an impermeable membrane 102. Leak detection system 100 operates by placing conductive geotextile 10, as described above, on the opposite side of impermeable membrane 102 of a leak detector 104, and is particularly useful when geomembrane 102 would otherwise be placed on a non-conductive surface, where conductive polymer layer 20 is connected to an electrical ground 108. Electrical ground 108 may exist underneath membrane 102, or it may be placed above membrane 102, and a connection provided through membrane 102 in order to connect conductive geotextile 10 to electrical ground 108. Leak detector 104 is connected to a voltage source 110, which provides an electrical potential difference between detector 104 and conductive geotextile 10. Leak detector 104 is scanned across the surface of impermeable membrane 102 and if a fluid passage through impermeable membrane 102 is encountered, an electrical connection between detector 104 and conductive geotextile 10 will be established, therefore detecting a leak. The actual process for detecting leaks using a detector is well known in the art, and therefore only a brief description is provided herein.

Referring to FIG. 7, leak detection system 100 may be used to detect leaks in impermeable membrane 102 used on top of a building 116 to seal a rooftop 118 that is made from a non-conductive material, such as wood. Conductive geotextile 10 may first be placed directly on roof 118 and have impermeable membrane 102 placed on top to seal roof 118. Conductive polymer layer 20 of conductive geotextile is has connection 120 to electrical ground 108. Electrical ground 108 may be ground 114, as shown in FIG. 9, or a ground within building 116. Detector 104, connected to voltage source 110 is scanned across the surface of impermeable membrane 102 to detect leaks across membrane 102.

Referring to FIG. 8, conductive geotextile 10 is placed on a non-conductive surface, such as a layer of gravel or dry sand 106. It will be understood that, while all materials have some conductivity, the term "non-conductive" as used herein refers to a material with a conductivity that is low enough that it cannot reliably be used in an electrical system, such as a ground connection for the purpose of electrical leak detection. Conductive geotextile 10 is connected to electrical ground 108, which may be a portion of the terrain that is away from geomembrane 102, a ground connection on the test equipment, or other suitable connection.

In another example, depicted in FIG. 9, leak detection system 100 may be used with a dual membrane liner, which may be used with more hazardous materials such as those present in landfills, in order to detect a leak across an upper impermeable membrane 102a. In the present example, conductive geotextile is placed directly underneath upper membrane 102a and on top of a geonet 112, which is placed on top of a lower impermeable membrane 102b. Conductive geotextile 10 may be laminated on geonet 112. Additional layers may be included, such as additional drainage structures between the membranes, or additional geotextiles. Lower membrane 102b sits on top of a ground 114, which may or may not be conductive. Similar to embodiment depicted in FIG. 8, a connection is provided to electrical ground 108 from conductive polymer layer 20 of conductive geotextile 10, which may pass through either of the upper or lower membranes 102a and 102b. Detector 104, connected to voltage source 110, is scanned across the surface of upper impermeable membrane 102a to detect leaks across upper membrane 102a.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A conductive geotextile for use in a leak detection system, the conductive geotextile comprising:
   a flexible substrate having a first face and a second face; and
   a polymer layer having apertures formed therethrough, the polymer layer being equal to or less than 0.006 inches thick and having a first face and a second face, the polymer layer being laminated to the substrate such that the first face of the substrate is adjacent to the second face of the polymer layer, wherein the polymer layer comprises a conductive thin film coextruded onto a core, such that the first face of the polymer layer comprises the conductive thin film, the conductive thin film being equal to or less than 0.003 inches thick and having a surface resistivity of equal to or less than 4000 ohms per square;
   wherein the conductive geotextile is permeable to fluids through the flexible substrate and the apertures of the polymer layer.

2. The conductive geotextile of claim 1, wherein the second face of the polymer layer comprises one or more additional polymer thin films coextruded onto the core.

3. The conductive geotextile of claim 1, wherein the substrate and polymer layers are laminated by needlepunching, heat bonding, or adhesive.

4. The conductive geotextile of claim 1, wherein the substrate is selected from a group consisting of: a woven geotextile, a non-woven geotextile, a knitted fabric, a laid fabric, and a woven tape.

5. The conductive geotextile of claim 1, wherein the polymer layer comprises a connector portion that extends past a side edge of the substrate.

6. The conductive geotextile of claim 1, wherein the polymer layer comprises a connector portion that wraps around a side edge of the substrate from the first face of the substrate to the second face of the substrate.

7. A leak detection system that detects a leak across an electrically insulating and impermeable membrane, the leak detection system comprising:
   a conductive geotextile sheet that is separate and distinct from the membrane, the conductive geotextile sheet comprising:
      a flexible substrate having a first face and a second face; and
      a polymer layer having a first face and a second face, the polymer layer being laminated to the substrate such that the first face of the substrate is adjacent to the second face of the polymer layer, wherein the polymer layer comprises a conductive thin film coextruded onto a core, such that the first face of the polymer layer comprises the conductive thin film;
   an electrical ground connected to the conductive thin film of the polymer layer;
   a detector; and
   a voltage source that applies an electrical potential between the detector and the conductive geotextile sheet across the membrane, such that the detector detects the leak when an electrical connection with the conductive geotextile sheet is formed.

8. The leak detection system of claim 7, wherein the second face of the polymer layer comprises one or more additional polymer layers coextruded onto the core.

9. The leak detection system of claim 7, wherein the polymer layer has a thickness of less than or equal to 0.006 inches.

10. The leak detection system of claim 7, wherein the polymer layer has a thickness of less than or equal to 0.003 inches.

11. The leak detection system of claim 7, wherein the polymer layer has a surface resistivity of less than or equal to 4000 ohms per square.

12. The leak detection system of claim 7, wherein the substrate and polymer layers are laminated by needlepunching, heat bonding, or adhesive.

13. The leak detection system claim 7, wherein the conductive geotextile sheet is permeable to fluids.

14. The leak detection system of claim 7, wherein the conductive geotextile sheet is placed between the membrane and a non-conductive surface.

15. The leak detection system of claim 7, wherein the substrate is selected from a group consisting of: a woven geotextile, a non-woven geotextile, a knitted fabric, a laid fabric, and a woven tape.

16. The leak detection system of claim 7, wherein the polymer layer comprises a connector portion that extends past a side edge of the substrate.

17. The leak detection system of claim 7, wherein the polymer layer comprises a connector portion that wraps around a side edge of the substrate from the first face of the substrate to the second face of the substrate.

18. The leak detection system of claim 7, wherein the conductive geotextile sheet is placed between two electrically insulating and impermeable membranes.

19. The leak detection system of claim 7, wherein the second face of the conductive geotextile sheet is laminated to a geonet.

\* \* \* \* \*